(12) United States Patent
Sun et al.

(10) Patent No.: US 12,542,568 B2
(45) Date of Patent: Feb. 3, 2026

(54) POWER RUGGED FILTER MODULE

(71) Applicant: Skyworks Solutions, Inc., Irvine, CA (US)

(72) Inventors: Weimin Sun, Santa Rosa Valley, CA (US); Shihan Qin, Newbury Park, CA (US); Hai H. Ta, San Diego, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 439 days.

(21) Appl. No.: 17/982,323

(22) Filed: Nov. 7, 2022

(65) Prior Publication Data

US 2023/0147252 A1 May 11, 2023

Related U.S. Application Data

(60) Provisional application No. 63/276,839, filed on Nov. 8, 2021.

(51) Int. Cl.
*H04B 1/00* (2006.01)
*H03H 7/38* (2006.01)
(Continued)

(52) U.S. Cl.
CPC ............ *H04B 1/0057* (2013.01); *H03H 7/38* (2013.01); *H03H 7/463* (2013.01);
(Continued)

(58) Field of Classification Search
CPC .......... H04B 1/0057; H04B 5/79; H04B 1/40; H04B 1/18; H04B 5/24; H04B 5/266; H04B 1/04; H04B 1/0458; H04B 5/263; H04B 5/26; H04B 1/38; H04B 11/00; H04B 1/006; H04B 5/73; H04B 1/005; H04B 1/16; H04B 1/525; H04B 1/52; H04B 1/00; H04B 1/0064; H04B 5/45; H04B 5/77; H03H 7/38; H03H 7/463; H03H 9/02007; H03H 9/706; H03H 2009/02173; H03H 7/1758; H03H 7/1766; H03H 9/542; H03H 9/605; H03H 7/40; H03H 9/6483; H03H 9/725; H03H 9/02574; H03H 9/25; H03H 9/0557; H03H 9/145; H03H 9/02559; H03H 9/6476; H03H 9/72; H03H 2009/2442; H03H 3/0072; H03H 3/0073; H03H 9/0561; H03H 9/1057; H03H 9/14552; H03H 9/2405; H03H 9/2426; H03H 9/2431; H03H 9/2436; H03H 9/2452; H03H 9/2463; H03H 9/2473; H03H 9/2478; H03H 9/02228;
(Continued)

(56) References Cited

U.S. PATENT DOCUMENTS 7,239,217 B2 7/2007 Satoh et al.
8,686,537 B2 4/2014 Sun et al.
(Continued)

*Primary Examiner* — John W Poos
(74) *Attorney, Agent, or Firm* — Knobbe, Martens, Olson & Bear LLP

(57) ABSTRACT

A filter module has a first terminal, a second terminal, and at least one filter disposed along each signal path extending from the first terminal to the second terminal. The filter can include a plurality of series resonators and a plurality of shunt resonators disposed between the series resonators and a ground configured to enhance power ruggedness of the filter module. A matching circuit coupled to the filter performs impedance matching of the filter.

22 Claims, 14 Drawing Sheets

US 12,542,568 B2
Page 2

(51) Int. Cl.
*H03H 7/46* (2006.01)
*H03H 9/02* (2006.01)
*H03H 9/70* (2006.01)

(52) U.S. Cl.
CPC ........ *H03H 9/02007* (2013.01); *H03H 9/706* (2013.01); *H03H 2009/02173* (2013.01)

(58) Field of Classification Search
CPC ......... H03H 9/0566; H03H 2001/0057; H03H 9/64; H03H 9/568; H03H 9/0222; H03H 9/14538; H03H 11/02; H03H 2003/023; H03H 2009/02385; H03H 2009/02496; H03H 2009/02503; H03H 2009/02519; H03H 2009/02527; H03H 3/02; H03H 7/075; H03H 9/0014; H03H 9/54; H03H 11/30; H03H 2009/02488; H03H 2009/155; H03H 2009/241; H03H 9/02031; H03H 9/02078; H03H 9/0552; H03H 9/172; H03H 9/175; H03H 9/46; H03H 9/564; H03H 9/6436; H03H 9/6463; H03H 9/6489; H03H 1/00; H03H 2007/006; H03H 3/10; H03H 9/02015; H03H 9/02157; H03H 9/02645; H03H 9/02653; H03H 9/02771; H03H 9/02834; H03H 9/02866; H03H 9/02992; H03H 9/1457; H03H 9/465; H03H 9/52; H03H 9/585; H03H 9/6433; H03H 9/6493; H03H 9/70; H03H 3/04; H03H 7/0115; H03H 7/1708; H03H 7/1775; H03H 9/0028; H03H 9/0042; H03H 9/02118; H03H 9/02551; H03H 9/02818; H03H 9/02881; H03H 9/0542; H03H 9/14544; H03H 9/545; H03H 9/58; H03H 9/584; H03H 9/586; H02J 50/12; H02J 50/70; H02J 50/60; H02J 50/90; H02J 50/80; H02J 50/50; H02J 7/0047; H02J 7/00304; H02J 7/00034; H02J 7/35; H02J 50/005; H02J 50/10; H02J 7/00309; H02J 2300/28; H02J 50/40; H02J 50/402; H02J 7/34; H02J 7/00045; H02J 50/502; H02J 50/05; H02J 7/0029; H02J 2310/48; H02J 7/00; H02J 50/20; H02J 50/30; H02J 2310/40; H02J 3/322; H02J 50/15; H02J 2207/40; H02J 2310/23; H02J 50/23
See application file for complete search history.

(56) References Cited

U.S. PATENT DOCUMENTS

| | | | |
|---|---|---|---|
| 8,889,995 | B2 | 11/2014 | Sun et al. |
| 8,896,091 | B2 | 11/2014 | Sun et al. |
| 9,041,472 | B2 | 5/2015 | Chen et al. |
| 9,287,226 | B2 | 3/2016 | Sun et al. |
| 9,472,514 | B2 | 10/2016 | Sun et al. |
| 9,531,413 | B2 | 12/2016 | Sun et al. |
| 9,647,703 | B2 | 5/2017 | Sun et al. |
| 9,660,584 | B2 | 5/2017 | Modi et al. |
| 9,660,606 | B2 | 5/2017 | Lyalin et al. |
| 9,748,627 | B2 | 8/2017 | Sun et al. |
| 9,847,755 | B2 | 12/2017 | Sun et al. |
| 9,859,231 | B2 | 1/2018 | Sun et al. |
| 9,978,732 | B2 | 5/2018 | Penunuri et al. |
| 10,090,812 | B2 | 10/2018 | Modi et al. |
| 10,128,558 | B2 | 11/2018 | Sun et al. |
| 10,224,977 | B2 | 3/2019 | Sun et al. |
| 10,263,594 | B2 | 4/2019 | Lyalin et al. |
| 10,263,602 | B2 | 4/2019 | Caron et al. |
| 10,553,570 | B2 | 2/2020 | Penunuri et al. |
| 10,554,177 | B2 | 2/2020 | Lyalin et al. |
| 10,608,606 | B2 | 3/2020 | Lee et al. |
| 10,623,046 | B2 | 4/2020 | Sun et al. |
| 10,693,422 | B2 | 6/2020 | Pan et al. |
| 10,778,174 | B2 | 9/2020 | Ta et al. |
| 10,892,715 | B2 | 1/2021 | Pan et al. |
| 10,931,253 | B2 | 2/2021 | Ta et al. |
| 10,951,248 | B1* | 3/2021 | Kamgaing ........... H04B 1/0075 |
| 11,070,174 | B2 | 7/2021 | Lyalin et al. |
| 11,088,675 | B2 | 8/2021 | Caron et al. |
| 11,211,911 | B2 | 12/2021 | Jung et al. |
| 11,245,432 | B2 | 2/2022 | Farahvash et al. |
| 11,342,898 | B2 | 5/2022 | Ta et al. |
| 11,881,841 | B2* | 1/2024 | Yasuda ................ H03H 9/6403 |
| 2005/0206478 | A1 | 9/2005 | Satoh et al. |
| 2009/0201104 | A1* | 8/2009 | Ueda ..................... H03H 9/6483 333/195 |
| 2012/0222892 | A1 | 9/2012 | Sun et al. |
| 2012/0223422 | A1 | 9/2012 | Sun et al. |
| 2014/0002188 | A1 | 1/2014 | Chen et al. |
| 2014/0175629 | A1 | 6/2014 | Sun et al. |
| 2014/0320205 | A1 | 10/2014 | Lyalin et al. |
| 2014/0320252 | A1 | 10/2014 | Sun et al. |
| 2015/0044863 | A1 | 2/2015 | Sun et al. |
| 2015/0061092 | A1 | 3/2015 | Sun et al. |
| 2015/0326181 | A1 | 11/2015 | Chen et al. |
| 2015/0326182 | A1 | 11/2015 | Chen et al. |
| 2015/0326183 | A1 | 11/2015 | Chen et al. |
| 2016/0043458 | A1 | 2/2016 | Sun et al. |
| 2016/0080011 | A1 | 3/2016 | Sun et al. |
| 2016/0080012 | A1 | 3/2016 | Sun et al. |
| 2016/0093578 | A1 | 3/2016 | Penunuri et al. |
| 2016/0380594 | A1 | 12/2016 | Sun et al. |
| 2017/0069584 | A1 | 3/2017 | Sun et al. |
| 2017/0230075 | A1 | 8/2017 | Sun et al. |
| 2017/0257070 | A1 | 9/2017 | Modi et al. |
| 2017/0324136 | A1 | 11/2017 | Sun et al. |
| 2018/0006626 | A1 | 1/2018 | Lyalin et al. |
| 2018/0226950 | A1 | 8/2018 | Caron et al. |
| 2018/0358338 | A1 | 12/2018 | Penunuri et al. |
| 2019/0028078 | A1 | 1/2019 | Lee et al. |
| 2019/0165738 | A1 | 5/2019 | Pan et al. |
| 2019/0165739 | A1 | 5/2019 | Lyalin et al. |
| 2019/0165752 | A1 | 5/2019 | Ta et al. |
| 2019/0245508 | A1 | 8/2019 | Lyalin et al. |
| 2019/0245577 | A1 | 8/2019 | Sun et al. |
| 2019/0267971 | A1 | 8/2019 | Caron et al. |
| 2019/0319772 | A1* | 10/2019 | Ando ...................... H04L 5/14 |
| 2020/0028479 | A1 | 1/2020 | Ta et al. |
| 2020/0028481 | A1 | 1/2020 | Sun et al. |
| 2020/0028489 | A1 | 1/2020 | Ta et al. |
| 2020/0028492 | A1 | 1/2020 | Ta et al. |
| 2020/0028493 | A1 | 1/2020 | Ta et al. |
| 2020/0186202 | A1 | 6/2020 | Baldwin et al. |
| 2020/0228085 | A1 | 7/2020 | Jung et al. |
| 2020/0287583 | A1 | 9/2020 | Farahvash et al. |
| 2020/0336113 | A1 | 10/2020 | Pan et al. |
| 2020/0382070 | A1 | 12/2020 | Lyalin et al. |
| 2021/0058051 | A1 | 2/2021 | Ta et al. |
| 2021/0119598 | A1 | 4/2021 | Ta et al. |
| 2021/0135631 | A1 | 5/2021 | Pan et al. |
| 2021/0175865 | A1 | 6/2021 | Lee et al. |
| 2021/0313964 | A1* | 10/2021 | Sung ..................... H03H 9/542 |
| 2021/0320626 | A1 | 10/2021 | Lyalin et al. |
| 2021/0344327 | A1 | 11/2021 | Caron et al. |
| 2022/0045710 | A1 | 2/2022 | Farahvash et al. |
| 2022/0123708 | A1 | 4/2022 | Ta et al. |
| 2022/0200639 | A1 | 6/2022 | Sun et al. |
| 2022/0200645 | A1 | 6/2022 | Sun et al. |
| 2022/0255524 | A1 | 8/2022 | Ta et al. |
| 2022/0302604 | A1 | 9/2022 | Sun |

* cited by examiner

| BAND | PARAMETER | FREQ (MHz) | POWER |
|---|---|---|---|
| N79 | MAX POWER | 5000 | 33dBm |
| N79 | MAX POWER | 4950 | 35dBm |
| N79 | MAX POWER | 4980 | 35dBm |

POWER RUGGED FILTER MODULE

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

BACKGROUND

Field

Embodiments of the invention relate to electronic systems, and in particular, to a filter nodule for use in radio frequency (RF) electronics.

Description of the Related Technology

Filters are used in radio frequency (RF) communication systems to allow signals to pass through at discreet frequencies but reject any frequency outside of the specified range. It is important to manage the power of the filter at high radio frequency to avoid damages on a device.

Examples of RF communication systems with one or more filter module include, but are not limited to, mobile phones, tablets, base stations, network access points, customer-premises equipment (CPE), laptops, and wearable electronics. For example, in wireless devices that communicate using a cellular standard, a wireless local area network (WLAN) standard, and/or any other suitable communication standard, a power amplifier can be used for RF signal amplification. An RF signal can have a frequency in the range of about 30 kHz to 300 GHz, such as in the range of about 410 MHz to about 7.125 GHz for certain communications standards.

DETAILED DESCRIPTION OF EMBODIMENTS

Figure 1:
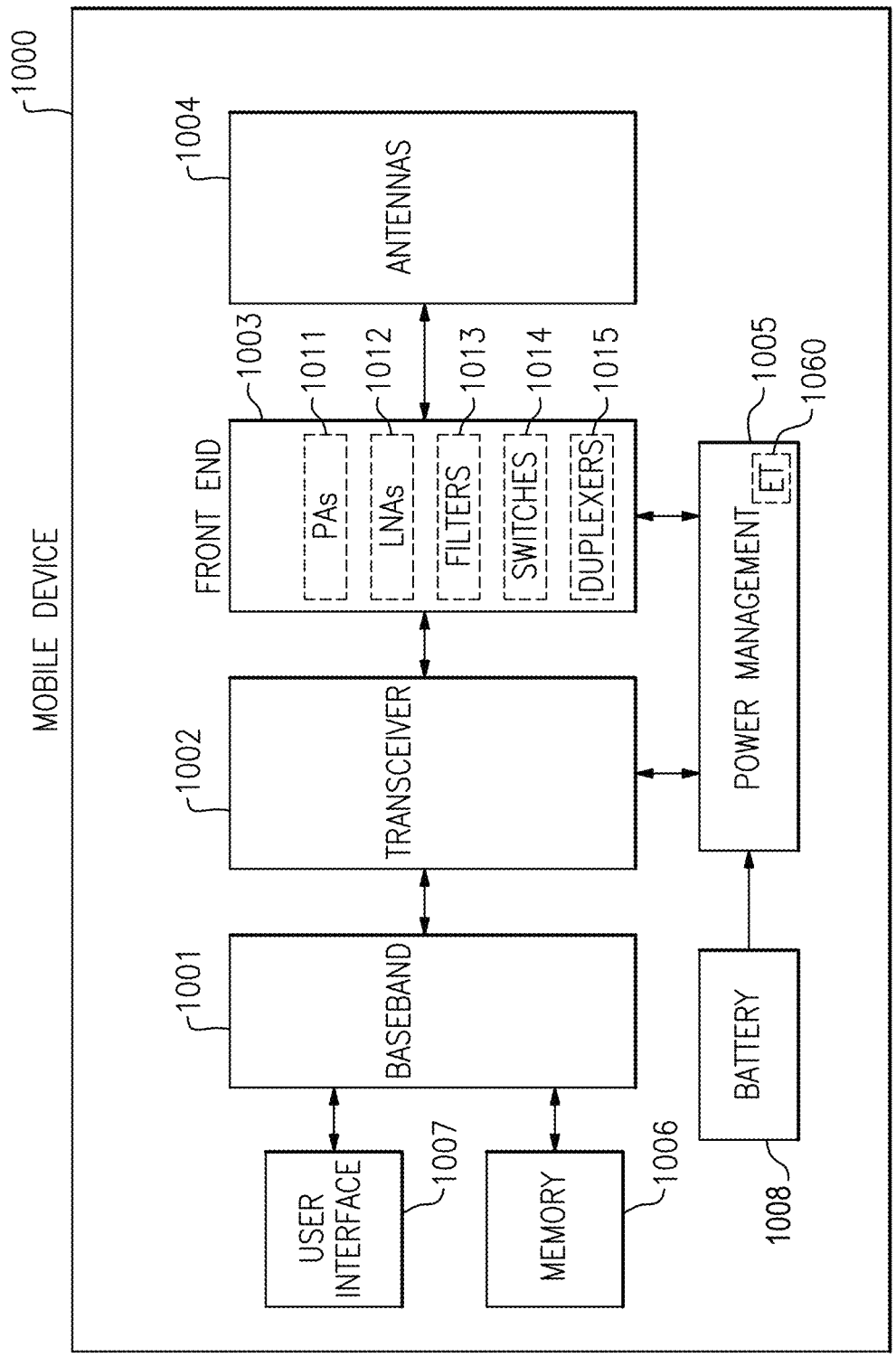
FIG. 1 is a schematic diagram of one embodiment of a mobile device.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

FIG. 1 is a schematic diagram of one example of a mobile device 1000. The mobile device 1000 includes a baseband system 1001, a transceiver 1002, a front end system 1003, antennas 1004, a power management system 1005, a memory 1006, a user interface 1007, and a battery 1008.

The mobile device 1000 can be used communicate using a wide variety of communications technologies, including, but not limited to, 2G, 3G, 4G (including LTE, LTE-Advanced, and LTE-Advanced Pro), 5G, WLAN (for instance, Wi-Fi), WPAN (for instance, Bluetooth and ZigBee), WMAN (for instance, WiMax), and/or GPS technologies.

The transceiver 1002 generates RF signals for transmission and processes incoming RF signals received from the antennas 1004. It will be understood that various functionalities associated with the transmission and receiving of RF signals can be achieved by one or more components that are collectively represented in FIG. 1 as the transceiver 1002. In one example, separate components (for instance, separate circuits or dies) can be provided for handling certain types of RF signals.

The front end system 1003 aids is conditioning signals transmitted to and/or received from the antennas 1004. In the illustrated embodiment, the front end system 1003 includes power amplifiers (PAs) 1011, low noise amplifiers (LNAs) 1012, filters 1013, switches 1014, and duplexers 1015. However, other implementations are possible.

For example, the front end system 1003 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 1000 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band and/or in different bands.

The antennas 1004 can include antennas used for a wide variety of types of communications. For example, the antennas 1004 can include antennas associated transmitting and/or receiving signals associated with a wide variety of frequencies and communications standards.

In certain implementations, the antennas 1004 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 1000 can operate with beamforming in certain implementations. For example, the front end system 1003 can include phase shifters having variable phase controlled by the transceiver 1002. Additionally, the phase shifters are controlled to provide beam formation and directivity for transmission and/or reception of signals using the antennas 1004. For example, in the context of signal transmission, the phases of the transmit signals provided to the antennas 1004 are controlled such that radiated signals from the antennas 1004 combine using constructive and destructive interference to generate an aggregate transmit signal exhibiting beam-like qualities with more signal strength propagating in a given direction. In the context of signal reception, the phases are controlled such that more signal energy is received when the signal is arriving to the antennas 1004 from a particular direction. In certain implementations, the antennas 1004 include one or more arrays of antenna elements to enhance beamforming.

The baseband system 1001 is coupled to the user interface 1007 to facilitate processing of various user input and output (I/O), such as voice and data. The baseband system 1001 provides the transceiver 1002 with digital representations of transmit signals, which the transceiver 1002 processes to generate RF signals for transmission. The baseband system 1001 also processes digital representations of received signals provided by the transceiver 1002. As shown in FIG. 1, the baseband system 1001 is coupled to the memory 1006 of facilitate operation of the mobile device 1000.

The memory 1006 can be used for a wide variety of purposes, such as storing data and/or instructions to facilitate the operation of the mobile device 1000 and/or to provide storage of user information.

The power management system 1005 provides a number of power management functions of the mobile device 1000. The power management system 1005 of FIG. 1 includes an envelope tracker 1060. As shown in FIG. 1, the power management system 1005 receives a battery voltage form the battery 1008. The battery 1008 can be any suitable battery for use in the mobile device 1000, including, for example, a lithium-ion battery.

The mobile device 1000 of FIG. 1 illustrates one example of an RF communication system that can include power amplifier(s) implemented in accordance with one or more features of the present disclosure. However, the teachings herein are applicable to RF communication systems implemented in a wide variety of ways.

Figure 2:
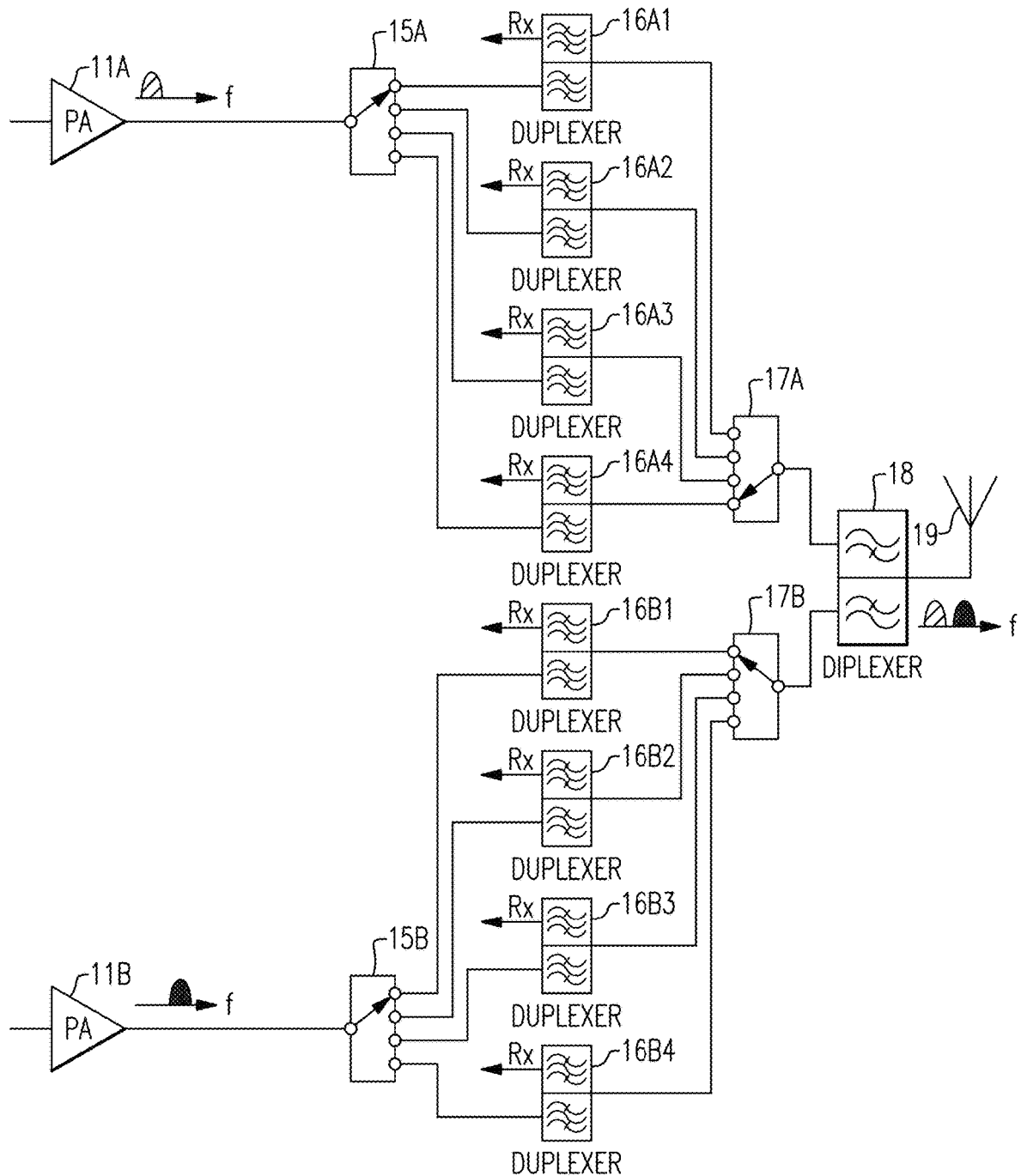
FIG. 2 is a schematic diagram of an electronic system 10 for a front end module.

FIG. 2 is a schematic diagram of an electronic system 10 for a front end module.

The illustrated electronic system 10 includes power amplifiers 11A, 11B, band select switches 15A, 15B, duplexers 16A, 16B, antenna switches 17A, 17B, diplexer 18, and an antenna 19. In the circuit shown in FIG. 2, a first power amplifier 11A and a second power amplifier 11B can provide radio frequency (RF) signals that can be aggregated for transmission by the antenna 19. FIG. 2 illustrates the frequency domains of example signals provided by the power amplifiers 11A and 11B and the frequency domain of an example carrier aggregated transmit signal provided to the antenna 19. The power amplifiers 11A and 11B are examples of RF sources that provide RF signals. The first power amplifier 11A can be associated with a first carrier. The first power amplifier 11A can receive a first carrier and a first input signal and provide a first amplified RF signal. The second power amplifier 11B can be associated with a second carrier that is separate from the first carrier.

In the illustrated electronic system 10, relatively high isolation of each detected carrier signal from the other carrier can be provided due to isolation provided by one or more of (1) out-of-band filtering of each duplexer 16A/16B, (2) out-of-band isolation of the antenna diplexer 18, and (3) the directivity of a forward port of a directional coupler (not shown) to the reverse-traveling wave of the residual interfering carrier.

A first antenna switch 17A can selectively electrically connect the first duplexer 16A or other circuit elements (e.g., another duplexer associated with a different band of operation) to the diplexer 18. A second antenna switch 17B can selectively electrically connect the second duplexer 16B or other circuit elements to the diplexer 18. The diplexer 18 is a frequency domain multiplexing circuit that can implement frequency domain multiplexing of the RF signals received from the duplexers 16A and 16B, for example, by way of the antenna switches 17A and 17B, respectively.

The electronic system 10 illustrates FDD duplex filters combined via the diplexer 18. Any suitable principles and advantages discussed with reference to the electronic system 10 can be implemented in connection with other electronic systems, such as TDD aggregation systems with bulk acoustic wave (BAW) filter(s), and/or thin-film bulk acoustic resonator (FBAR) filter(s) with an additional transmit/receive switch for each band and/or an additional transmit/receive throw in each band select switch.

Figure 3A:
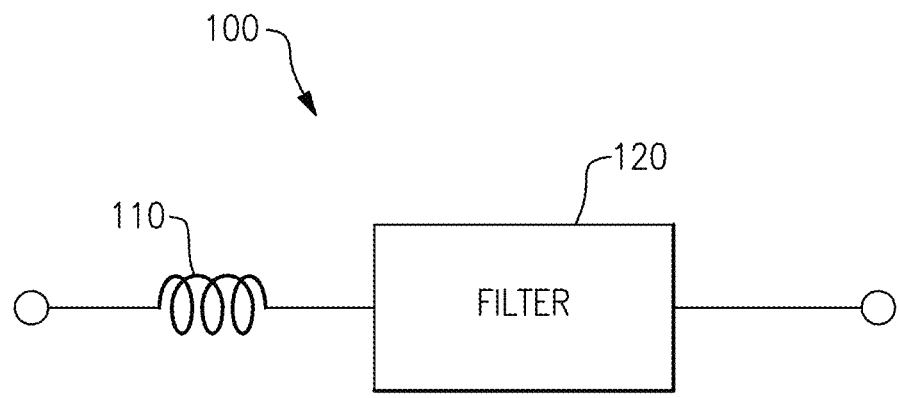
FIG. 3A is a diagram of a first example of a conventional filter module.
Figure 3B:
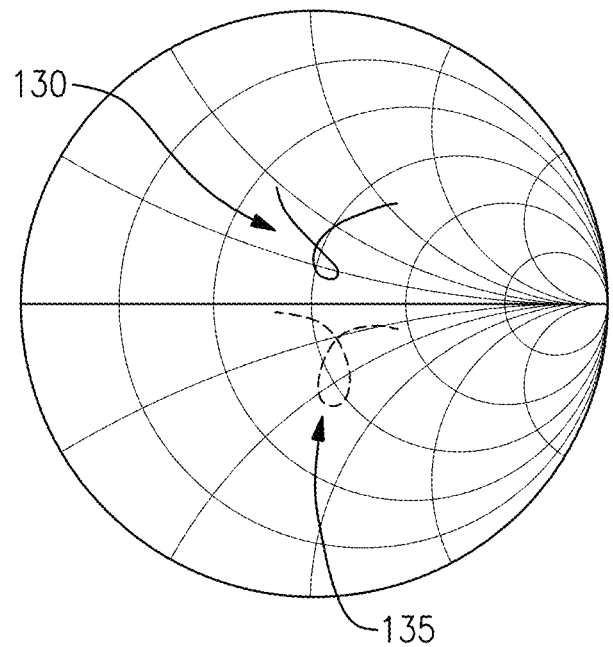
FIG. 3B is a Smith chart corresponding to the first conventional filter module of FIG. 3A.

FIG. 3 illustrates a first example of a filter module 100 in which a matching inductor 110 is applied to a band-pass filter 120. As shown in the circuit diagram of FIG. 3A, the matching inductor 110 is connected in series with and preceding the filter 120. Referring to the Smith chart of FIG. 3B, the impedance of the first conventional filter module 100 in the passband of the filter 120 is indicated by a solid line 130. The impedance 130 appears on the upper half of the Smith chart and is inductive. For comparison purposes, a comparative impedance of the filter 120 alone or without the matching inductor 110 is shown by a dashed line 135. This comparative impedance 135 appears on the lower half of the Smith chart and is capacitive.

Figure 4A:
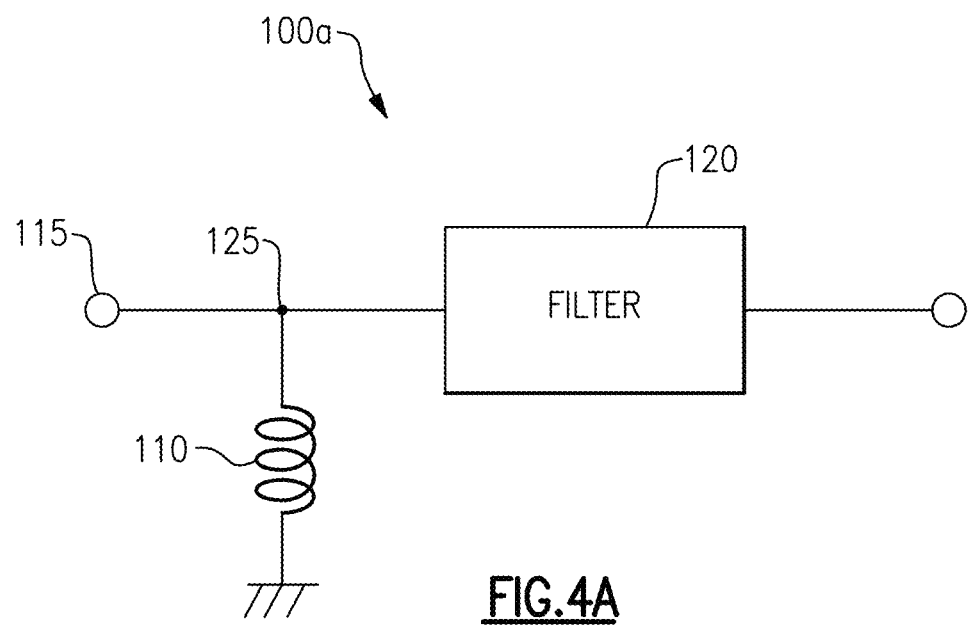
FIG. 4A is a diagram of a second example of a conventional filter module.
Figure 4B:
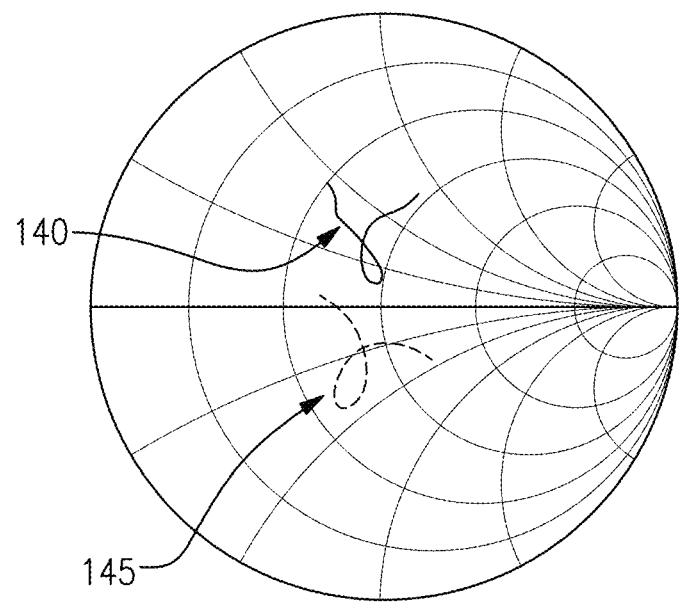
FIG. 4B is a Smith chart corresponding to the second conventional filter module of FIG. 4A.

FIG. 4 illustrates a second example of a filter module 100a in which a matching inductor 110 is applied to a band-pass filter 120. As shown in the diagram of FIG. 4A, the matching inductor 110 is connected in parallel with and preceding the filter 120. In other words, the inductor 110 is connected between the ground and a node 125 joining the input terminal 115 with the filter 120. Referring to the Smith chart of FIG. 4B, the impedance of the second conventional filter module 100a in the passband of the filter 120 is indicated by a solid line 140. The impedance 140 appears on the upper half of the Smith chart and is inductive. For comparison purposes, the impedance of the filter 120 alone or without the matching inductor 110 shown by a dashed line 145, which largely appears on the lower half of the Smith chart and is capacitive.

Figure 5:
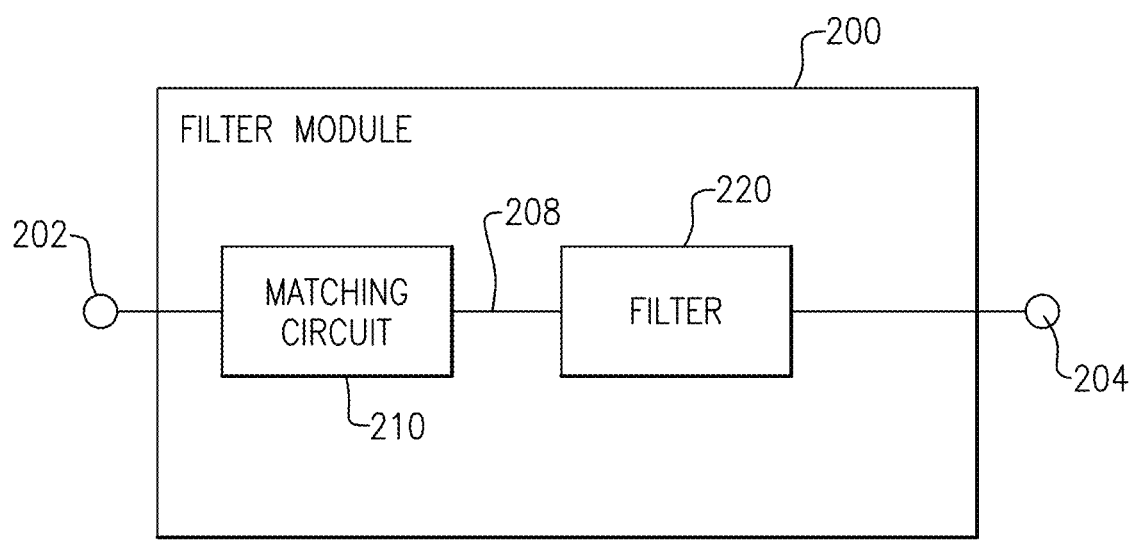
FIG. 5 is a block diagram showing an example of a filter module.

FIG. 5 is a block diagram showing an example of a filter module 200. The filter module 200 includes a filter 220 and a matching circuit 210. In one example the filter 220 is a band-pass filter that passes a certain band and has an impedance matched to be inductive.

As shown in FIG. 5, the band-pass filter 220 is disposed along a signal path 208 extending from an input contact 202 of the filter module 200 to an output contact 204 of the filter module 200. Furthermore, as also shown in FIG. 5, the filter module 200 includes a matching circuit 210 connected between the input contact 202 and the filter 220.

It is to be appreciated that, although the filter module 200 includes a filter 220 configured by SAW resonators, other examples are not limited thereto. The filter 220 can include bulk acoustic wave (BAW) resonators or film bulk acoustic wave resonators (FBARs), for example, instead of or in addition to SAW resonators. The matching circuit 210 in the filter module 200 is inductive in the passband of the filter 220 and therefore operates as an inductor. As a result, the filter module 220 according to an example can achieve an impedance in the passband of the filter module that is inductive without adding a matching inductor 110 in a conventional manner.

Meanwhile, 5G Wireless Communication has been adapted as the platform for phone, vehicle and IoT communications. The growth rate is unprecedent. Current 5G bands are mainly sub 6 GHz which is sweet band for BAW acoustic filter use. The current BAW technology has the advantage to support frequencies to 6 GHz or above frequencies while SAW technology is limited to below 3 GHz.

One of the common problem of BAW design, especially the FBAR design is the power limit due to the fact that its thermal dissipation path is limited by the top/bottom air layers, thus the BAW resonator may be damaged if the power dissipation is over the limit and temperature arises to too high. When operating at 5G frequencies, the optimal piezo-dielectric layer thickness is getting very thin which puts the thermal path further limited.

When the operation frequency is at or close to the resonator frequency, the power consumption (dissipation) is high from both acoustic loss and electric loss.

Prior solutions in BAW power improvement has been focused on resonator Q-factor improvement, power consumption density reduction or resonator size increase. More specifically, when resonator Q is improved or enhanced, the power dissipation or consumption is reduced at the same delivery power. When the resonator power consumption density is reduced, so the hottest temperature will be lower. However, the power density is averaged across the whole area of resonators and may not reduce the hottest area. When the resonator area that distributes the dissipated power is increased to larger area, the hottest spot temperature can be reduced. However, such improvements for a given frequency band and required performance can be of limited effectiveness. When the BAW resonator consumes high power and heats up, the resonator creates a temperature gradient from the center to edge with the center at the hottest, which explains why the power density reduction and resonator size increase can be of limited effectiveness.

According to embodiments of the present disclosure, a filter module with significantly improved power ruggedness is provided, e.g., by reducing power consumption of the filter module and by enhancing an allowed maximum power that the filter module can endure.

According to embodiments, resonator frequency can be intentionally shifted a few MHz to out of band. In this embodiment, the acoustic power consumption will be significantly reduced in band and the total delivered power will be significantly improved.

According to embodiments, Dual-Quad or Octane Resonator can significantly improve the max power (power ruggedness) by 3 dB from a Quad resonator connection, 6 dB from a Dual connection. Moreover, the Octane resonator can have potential to reduce harmonics and IMD significantly more than 6-12 dB.

Figure 6:
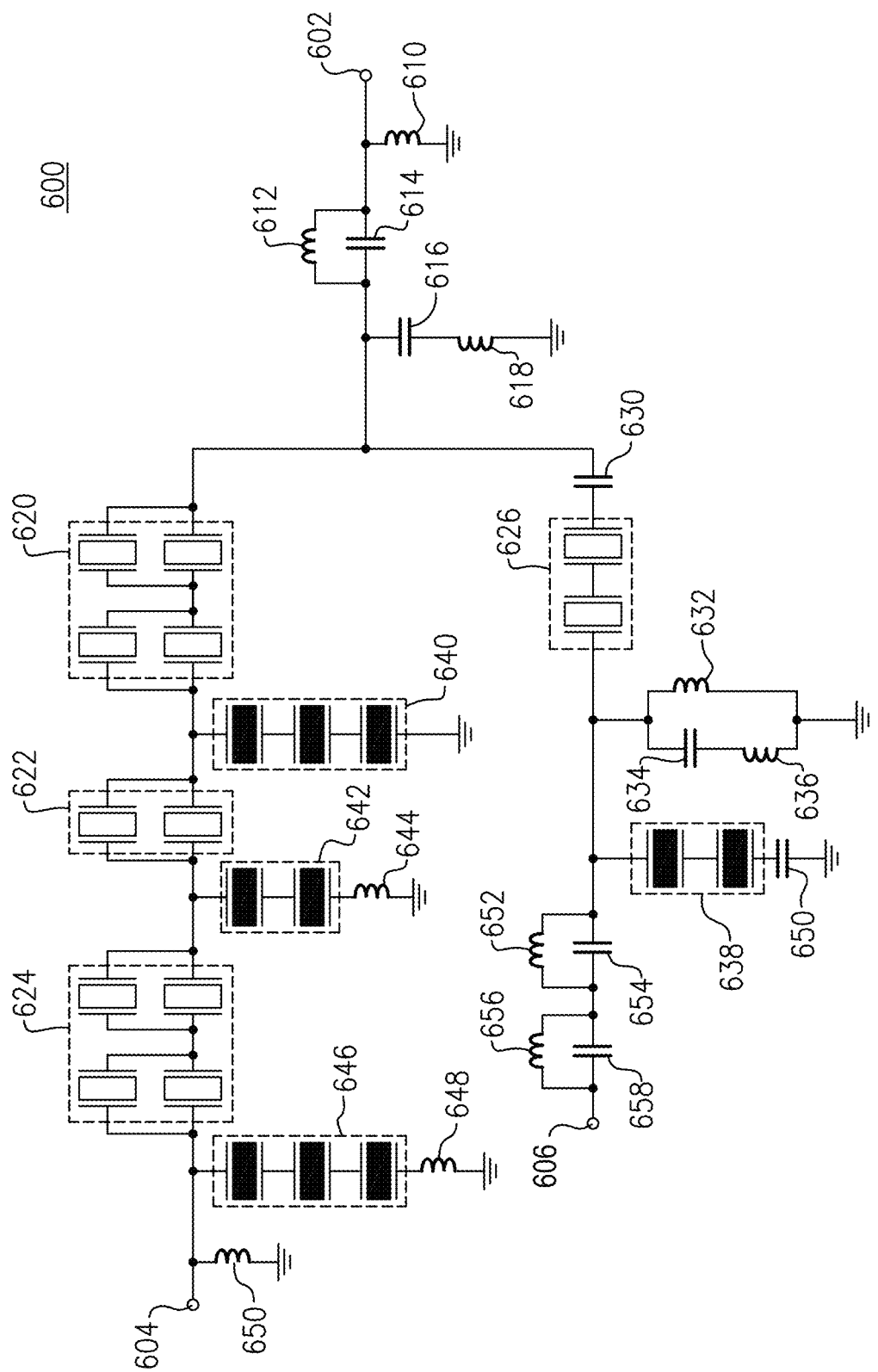
FIG. 6 is a schematic diagram of a diplexer.

FIG. 6 is a schematic diagram of a diplexer 600. The diplexer 600 can be used as a filter module. As shown in FIG. 6, the diplexer 600 has an input contact 602 and a first output contact 604 and a second output contact 606. The signal paths are extended from the input contact 602 to each of the first output contact 604 and the second output contact 606. The diplexer 600 may be implemented by a plurality of series resonators and a plurality of shunt resonators. Each of the series resonators and the shunt resonators can be a BAW resonator or FBAR.

The input contact 602 is connected to a ground via an inductor 610. The input contact 602 is connected to one end of a parallel connection of an inductor 612 and a capacitor 614. The other end of the parallel connection of an inductor 612 and a capacitor 614 is connected to a ground via a series connection of a capacitor 616 and an inductor 618. At least one element connected to the input contact 602 can be understood as a matching circuit configured for impedance matching.

On the signal path to the first output contact 604 from the input contact 602, the diplexer 600 has a plurality of series resonators 620, 622, 624. The series resonator 620 is a quad resonator circuit consisting of four resonators. The series resonator 620 be a form of two subsets of resonators connected in series, and each of the two subsets includes two resonators connected in parallel. The series resonator 622 is a dual resonator circuit consisting of two resonators connected in parallel. A node between the series resonators 620, 622 is connected to a ground via a series of shunt resonators 640 and an inductor 644. The resonator 608-3 is the quad resonator circuit. A node between the series resonators 622, 624 is connected to a ground via a series connection of shunt resonators 642 and an inductor 644. The first output contact 604 is connected to a ground via a series connection of shunt resonators 646 an inductor 648. The first output contact 604 is connected to the ground via an inductor 650.

On the signal path to the second output contact 606 from the input contact 602, the diplexer 600 has a capacitor 630, and a series resonator 626. The series resonator 626 is a dual resonator circuit consisting of two resonators connected in series. The other end on the series resonator 626 is connected to a ground via an inductor 632 in parallel with a series connection of a capacitor 634 and an inductor 636, and a series connection of two shunt resonators 638 and a capacitor 650. The output contact 606 is connected to the other end of the series resonator 626 via a series connection of two parallel-connected inductors 652, 656 and capacitors 654, 658.

Figure 7A:
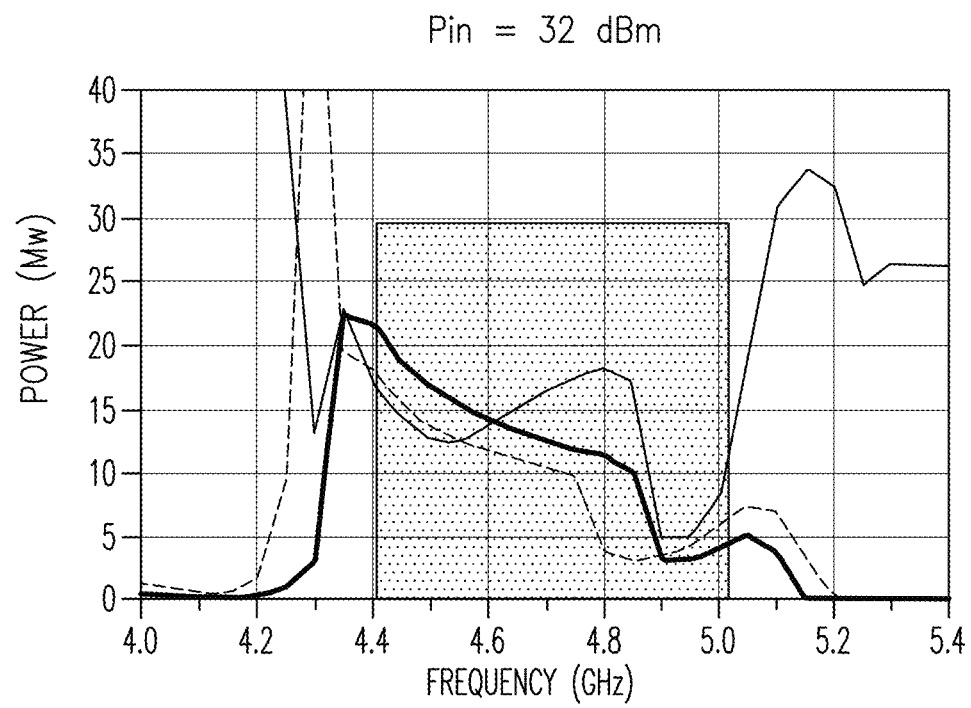
FIGS. 7A-7B are examples of graphs illustrating power consumption of the series resonators (7A) and shunt resonators (7B), respectively.
Figure 7B:
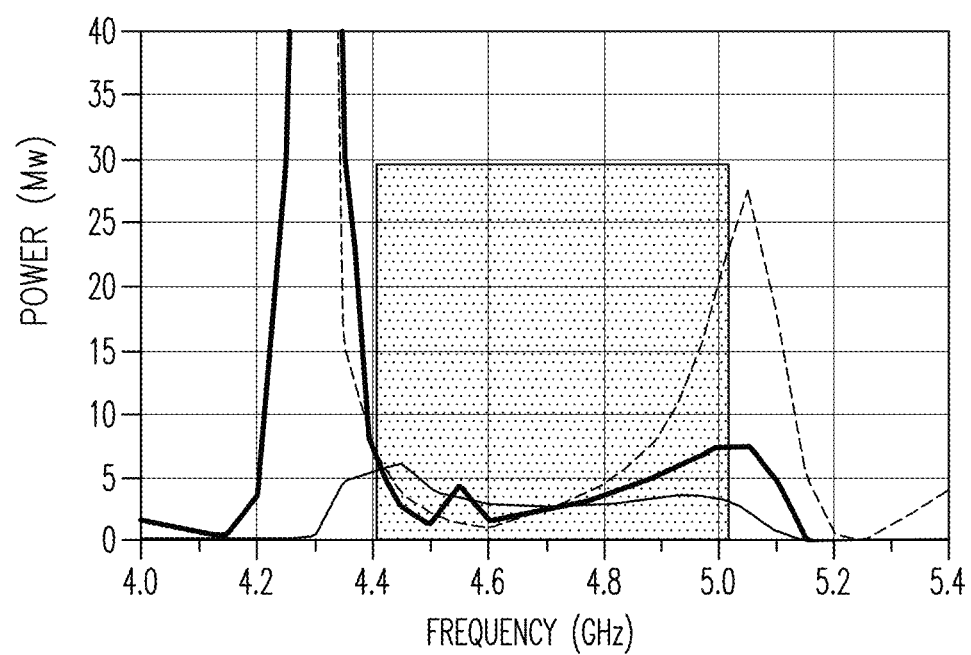

FIG. 7 is an example of graph illustrating dissipated power (mW) of the series resonators and shunt resonators. In FIG. 7, the input power is 32 dBm, and a target frequency band is N79 band, e.g. a range between 4.4 GHz and 5 GHz. FIG. 7A is an example of dissipated power of series resonators. FIG. 7B is an example of dissipated power of shunt resonators. For example, the target frequency band can be a communication band assigned to a filter module.

Figures 8, 9:
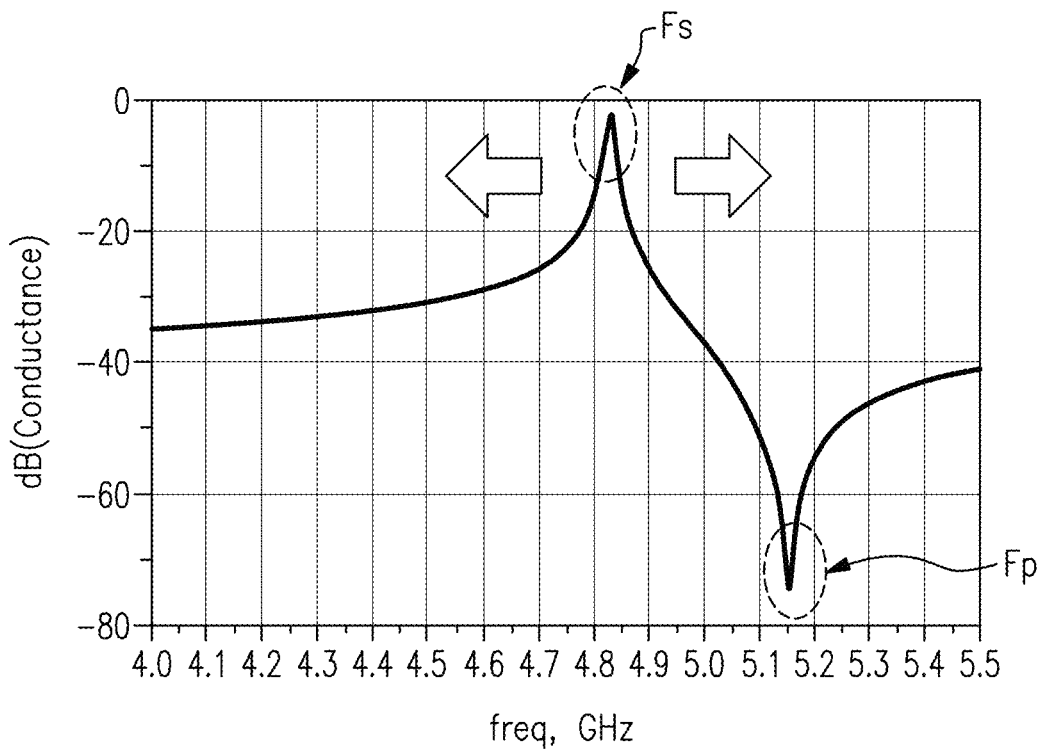
FIG. 8 is an example of conductance curve of that represents resonant frequency of a filter module.
FIG. 9 is an example of measured power consumptions of filters having different resonant frequencies.

FIG. 8 is an example of conductance curve of that represents resonant frequency of a filter module. FIG. 8 shows a resonant frequency (Fs) and an anti-resonant frequency (Fp). According to an embodiment, a filter module includes at least one filter. The filter can be implemented by a plurality of series resonators and a plurality of shunt resonators disposed between the series resonators and a ground. Each of the plurality of series resonators and the plurality of shunt resonators is a bulk acoustic wave (BAW) resonator or a film bulk acoustic resonator (FBAR).

A BAW resonator is an electromechanical device in which a standing acoustic wave is generated by an electrical signal in the bulk of a piezoelectric material. In the simplest configuration, a device will consist of a piezoelectric material (typically quartz, AlN, or ZnO) sandwiched between two metallic electrodes.

BAW resonators are compact, low-cost RF filters that can be used in a wide range of applications up to 6 GHz. Like SAW Filters, BAW filters also operate by converting electrical energy into acoustic or mechanical energy on a piezoelectric material. Since they can operate at higher frequencies, BAW filters are used for many of the new LTE bands above 1.9 GHz. They are also highly effective for LTE/Wi-Fi coexistence filters. Compared to SAW filters, BAW filters can operate at higher frequencies, are less sensitive to temperature changes, however, are more expensive.

The film bulk acoustic resonator (FBAR) is a widely-used MEMS device which can be used as a filter, or as a gravimetric sensor for biochemical or physical sensing. Current device architectures require the use of an acoustic mirror or a freestanding membrane and are fabricated as discrete components.

FBAR filter generates a bulk wave inside a piezoelectric thin film that is sandwiched between two electrodes. A high-frequency signal is applied to the electrodes and an acoustic wave resonates in the structure at a designed frequency determined primarily by the shape and thickness of the piezoelectric thin film.

The filter module include an input terminal, at least one output terminal, at least one filter disposed along each signal path extending from the input terminal to the at least one output terminal, and a matching circuit configured for impedance matching of the at least one filter and coupled to the at least one filter. The input terminal is connected to an antenna.

The filter is configured to have a resonator frequency shifted out of a target frequency band. The filter is configured to consume less power such that the power ruggedness is improved. More specifically, the filter is configured to consume less power while operating on the shifted resonator frequency than operating in the target frequency band. The target band is a range of frequency on which an input signal is delivered. For example, the target frequency band is in a range of sub 6 GHz, particularly between 4.4 GHz to 5 GHz.

As shown in FIG. 8, the resonant frequency (Fs) is where a series resonance or a parallel resonance occurs. The series resonance is a resonance condition that usually occurs in series circuits, where the current becomes a maximum for a particular voltage. In series resonance, the current is maximum at resonant frequency. Parallel resonance occurs when the supply frequency creates zero phase difference between the supply voltage and current producing a resistive circuit. In many ways a parallel resonance circuit may be exactly the same as the series resonance circuit.

The resonator frequency of the filter is deviated from the target frequency band by 3 MHz to 20 MHz. The deviation of the resonator frequency may be measured from an edge of the target frequency band. The resonant frequency of the filter can be shifted to be lower or higher than the target frequency band.

The resonant frequency of the filter can be determined by the characteristics of electrical element consisting the filter. For example, the resonant frequency of the filter can be determined by a shape and thickness of the piezoelectric thin film of each resonators. In manufacturing procedure, depending on desired power consumption of the filter, each of the characteristics of the electrical element can be collaboratively determined. Any type of manufacturing manner can be adopted, and it is not limited to a specific manner.

By shifting the resonant frequency of the filter intentionally, maximum power consumption can be reduced. According to an example, the signal passed the filter can be amplified in order to compensate the amount of reduced power.

In this embodiment, as will be described, the filter may include an octane resonator circuit configured to enhance an allowed maximum power of the filter. The octane resonator circuit consists of eight resonators connected to each other in combination of series connection and parallel connection.

FIG. 9 is an example of measured power consumptions of filters having different resonant frequencies. The power consumption of each filter has been measured in N79 band, e.g. 4400-5000 MHz.

As shown in FIG. 9, the power consumption of filter having resonant frequency of 5 GHz is 33 dBm. The power consumption of filter having resonant frequency of 4950 or 4980 MHz is 35 dBm.

Therefore, according to an embodiment, the power consumed by the filter has been significantly reduced when the resonant frequency of the filter is shifted higher or lower to be out of the target frequency band, where the target frequency band can be a communication band assigned to the filter.

Figure 10:
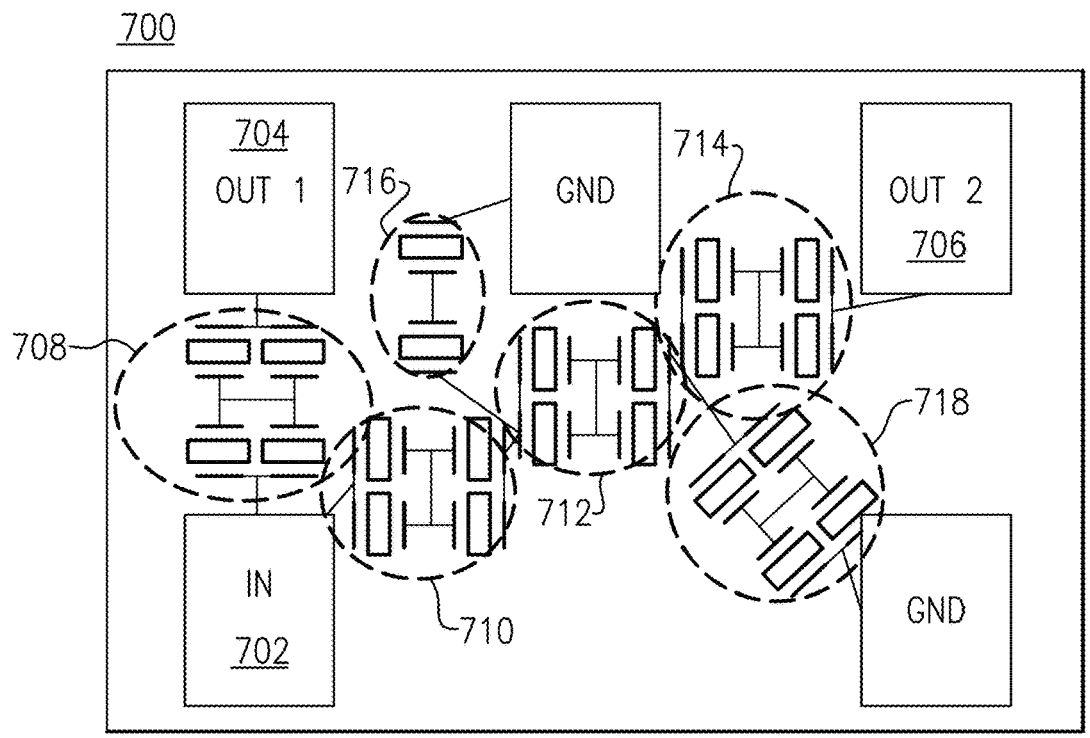
FIG. 10 is an example of schematic diagram illustrating connection of resonators for the filter module.

FIG. 10 is an example of schematic diagram illustrating connection of resonators for the filter module 700. In this embodiment, the filter module 700 includes an input contact 702, a first output contact 704, and a second output contact 706. The filter module further includes a filter disposed along the signal path extending from the input contact to the output contact. The filter is implemented by a plurality of series resonators and a plurality of shunt resonators disposed between the series resonators and a ground.

As shown in FIG. 10, a quad resonator circuit 708 is placed between an input contact 702 and a first output contact 704.

Along the signal path extending from the input contact 702 to the second output contact 706, three quad resonator circuits 710, 712, 714 are placed. A node between the quad resonator circuits 710, 712 can be connected to a ground via a dual resonator circuit 716. A node between the quad resonator circuits 712, 714 can be connected to a ground via a quad resonator circuit 718.

Along the signal paths extending from the input contact 702 to the first output contact 704 or to the second output contact 706, other electrical elements can be added as shown in FIG. 6. For example, the filter module 700 includes a matching circuit configured for impedance matching of the filter and coupled to the filter.

Figure 11:
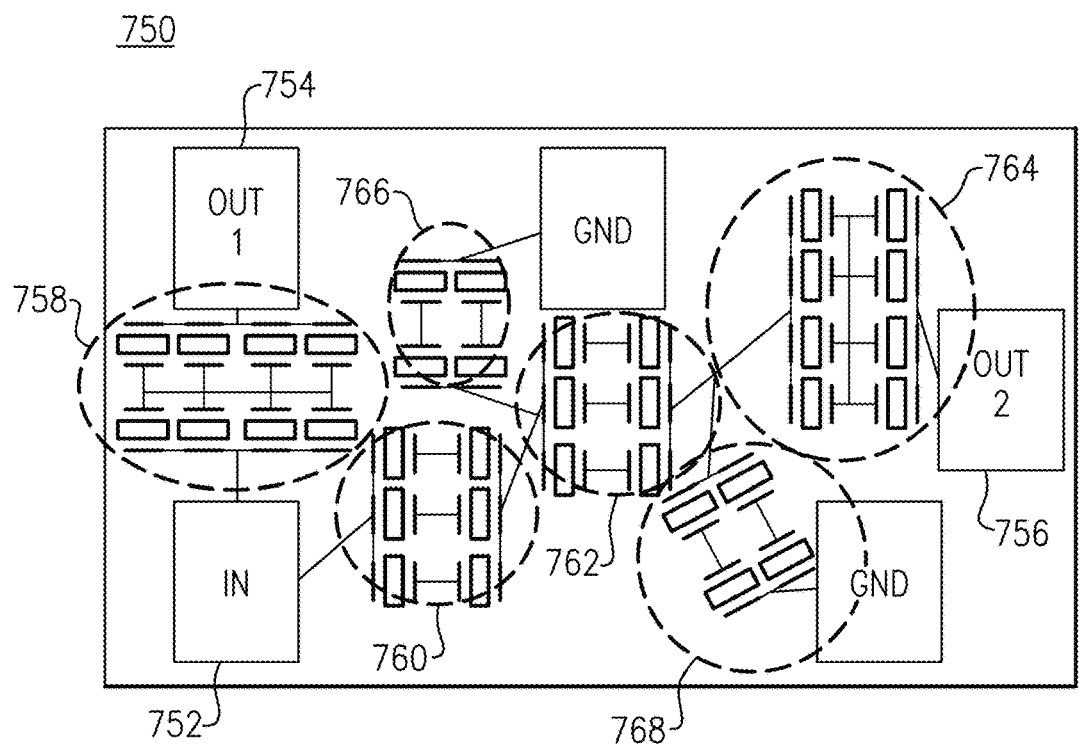
FIG. 11 is an example of schematic diagram illustrating connection of resonators for the filter module.

FIG. 11 is an example of schematic diagram illustrating connection of resonators for the filter module 750. In this embodiment, the filter module includes 750 a first terminal and at least one second terminal. The first terminal can be referred to as an input contact. The second terminal can be referred to as an output contact. In this embodiment, the filter module 750 includes 2 output contacts, but number of output contact is not limited thereto.

The filter module 750 according to an embodiment includes an input contact 752, a first output contact 754, and a second output contact 756. The filter module 750 further includes a filter disposed along the signal path extending from the input contact to the output contact. The filter is implemented by a plurality of resonator circuits.

In FIG. 11, the quad resonator circuits 708, 714 illustrated in FIG. 10 have been replaced with octane resonator circuits 758, 764. The quad resonator circuits 710, 712 in FIG. 10 have been replaced with hexane resonator circuits 760, 762 in FIG. 11. In addition, dual resonator circuit 716 has been replaced with quad resonator circuit 766 in FIG. 11.

More specifically, an octane resonator circuit 758 is placed between an input contact 752 and a first output contact 754. The octane resonator circuit 758 consists of eight resonators connected to each other in combination of series connection and parallel connection. For example, the eight resonator can be connected in a form of two subsets of resonators connected in series, and each of the subsets is a parallel connection of four resonators.

Along the signal path extending from the input contact 752 to the second output contact 756, two hexane resonator circuits 760, 762, and an octane resonator circuit 764 are placed. The hexane resonator circuits 760, 762 consist of six resonators. For example, the hexane resonator circuit 760, 762 are configured in a form of two subsets of resonators connected in series, and each of the subsets is three resonators connected in parallel.

A node between the hexane resonator circuits 760, 762 can be connected to a ground via a quad resonator circuit 766. A node between the hexane resonator circuit 762 and the octane resonator 764 can be connected to a ground via a quad resonator circuit 768.

Along the signal paths extending from the input contact 752 to the first output contact 754 or to the second output contact 756, other electrical elements can be added as shown in FIG. 6. For example, the filter module 750 includes a matching circuit configured for impedance matching of the filter and coupled to the filter.

By using more resonators, particularly using octane resonator circuits, the maximum power that the filter module 750 is able to endure can be enhanced, and the power ruggedness will be improved accordingly.

In addition to increasing the number of resonators, it is possible to intentionally shift the resonance frequency as described with FIG. 8 in order to reduce power consumption, and therefore power ruggedness can be significantly improved.

FIG. 12 is an example of graphs illustrating dissipated power (mW) of quad and octane resonators. In FIG. 12, the input power is 32 dBm, and a target frequency band is between 4.4 GHz and 5 GHz.

Figure 12A:
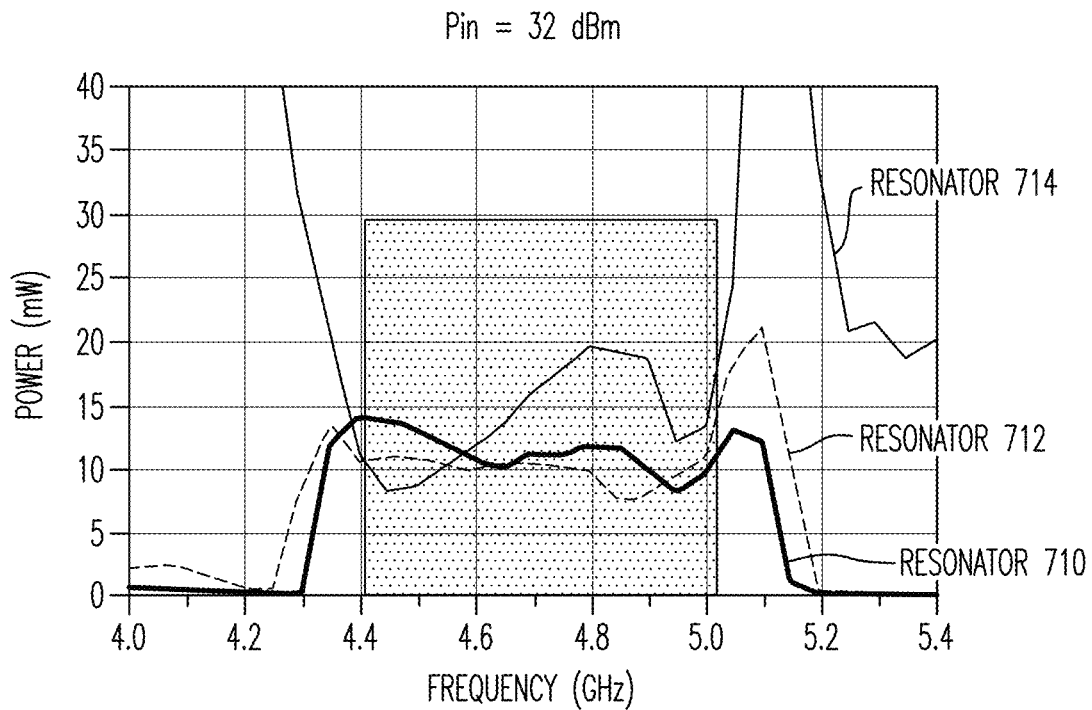
FIGS. 12A-12D are examples of graphs illustrating power consumption of various resonator configurations.

FIG. 12A is an example of dissipated power (mW) of series resonators, where each of the series resonators is a quad resonator circuit. Each line in FIG. 12A indicates power consumption of different series resonators 710, 712, 714 operating in frequency band between 4400-5000 MHz, as illustrated in FIG. 10.

Figure 12B:
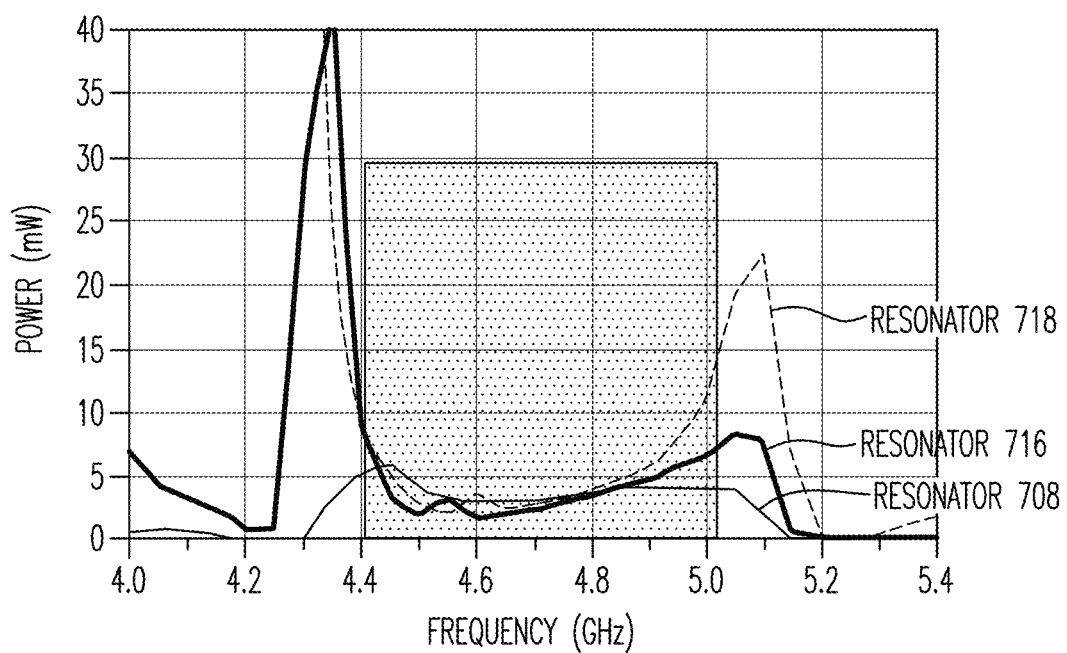
Figure 12C:
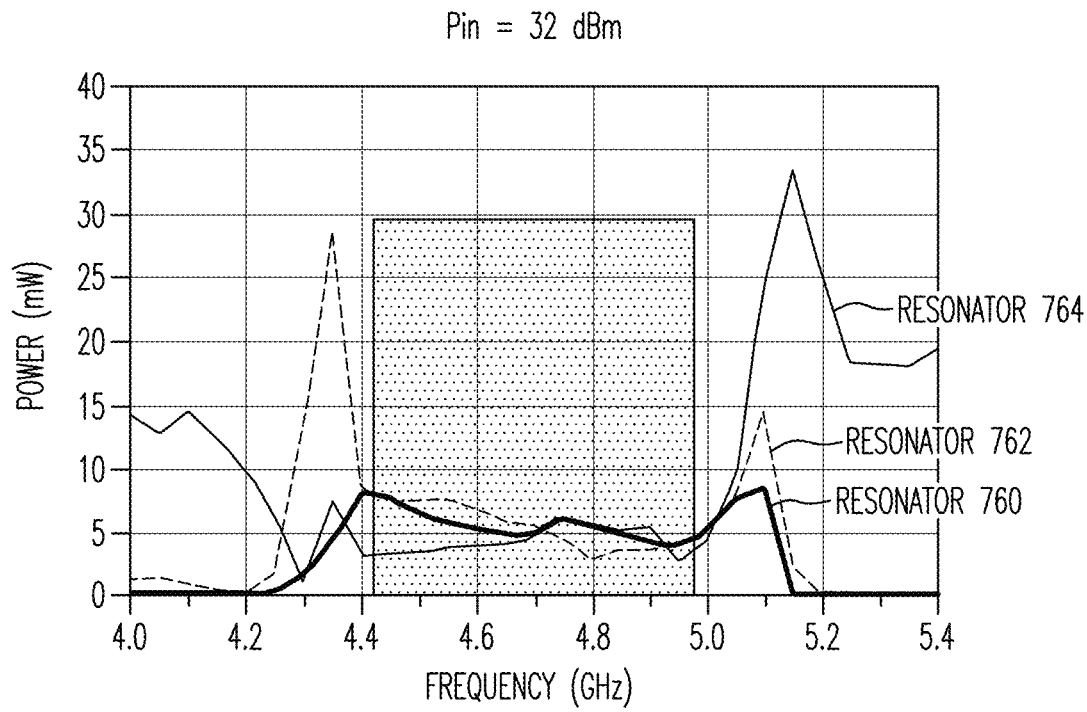

FIG. 12B is an example of dissipated power (mW) of shunt resonators, where the resonator 716 is a dual resonator circuit and each of the resonators 708 and 718 is a quad resonator circuit, as illustrated in FIG. 10. Each line in FIG. 12B indicates power consumption of different shunt resonators 708, 716, 718 operating in frequency band between 4400-5000 MHz, FIG. 12C is an example of dissipated power (mW) of series resonators, where each of the resonators 760 and 762 is a hexane resonator circuit and the resonator 764 is an octane resonator circuit, as illustrated in FIG. 11. Each line in FIG. 12C indicates power consumption of different series resonators 760, 762, 764 operating in frequency band between 4400-5000 MHz.

Figure 12D:
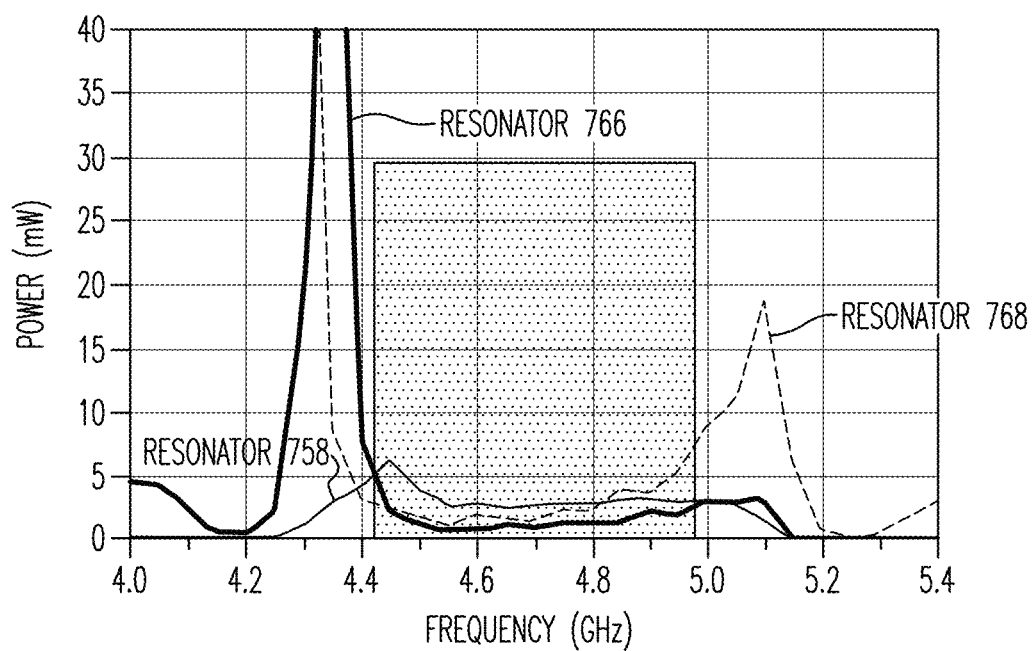

FIG. 12D is an example of dissipated power (mW) of shunt resonators, where the resonator 758 is an octane resonator circuit and each of the resonators 766 and 768 is a quad resonator circuit, as illustrated in FIG. 11. Each line in FIG. 12D indicates power consumption of different shunt resonators 758, 766, 768 operating in frequency band between 4400-5000 MHz.

As shown in FIG. 12, an octane resonator circuit can significantly improve the allowed maximum power (power ruggedness) of the filter by 3 dB from a quad resonator connection, 6 dB from a dual connection. In addition, the octane resonator circuit can have potential to reduce harmonics and inter-modulation distortion (IMD) significantly more than 6-12 dB.

FIG. 13 shows examples of connections of resonators for an octane resonator circuit. In FIG. 13, the highlighted side of each resonator indicates a direction of arrangement that is to be a top side of the filter module.

Figure 13A:
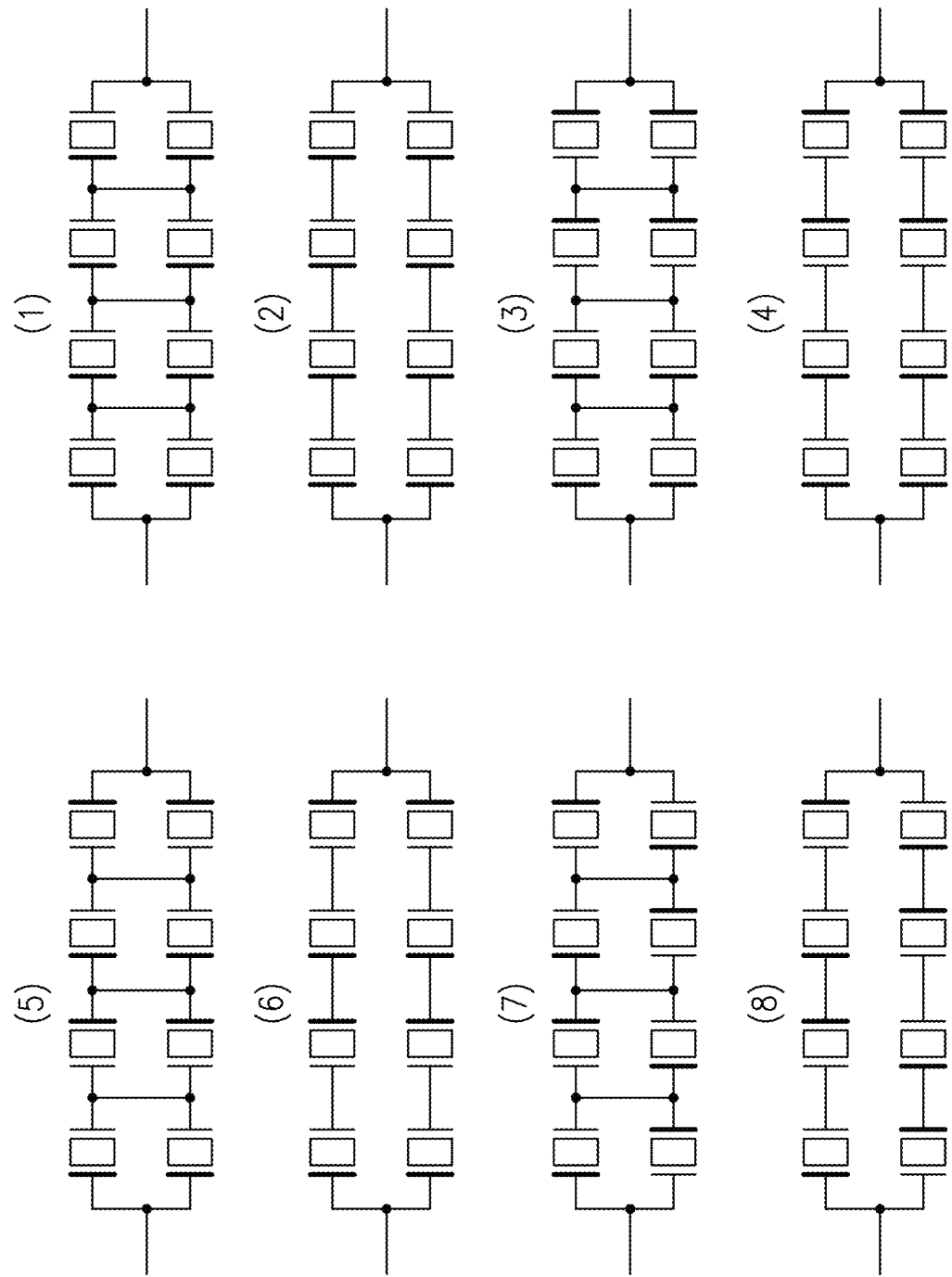
FIGS. 13A-B show examples of connections of resonators for an octane resonator circuit.

FIG. 13A-(1), (3), (5), and (7) describe a connection of resonators including four subsets connected in series, each of the subsets is a dual resonator connected in parallel. Each connection illustrated in FIG. 13A-(1), (3), (5), and (7) has different direction of arrangement for each of the resonators.

FIG. 13A-(2), (4), (6), and (8) describe a connection of resonators including two subsets connected in parallel, each of the subsets is a quad resonator connected in series. Each connection illustrated in FIG. 13A-(2), (4), (6), and (8) has different direction of arrangement for each of the resonators.

Figure 13B:
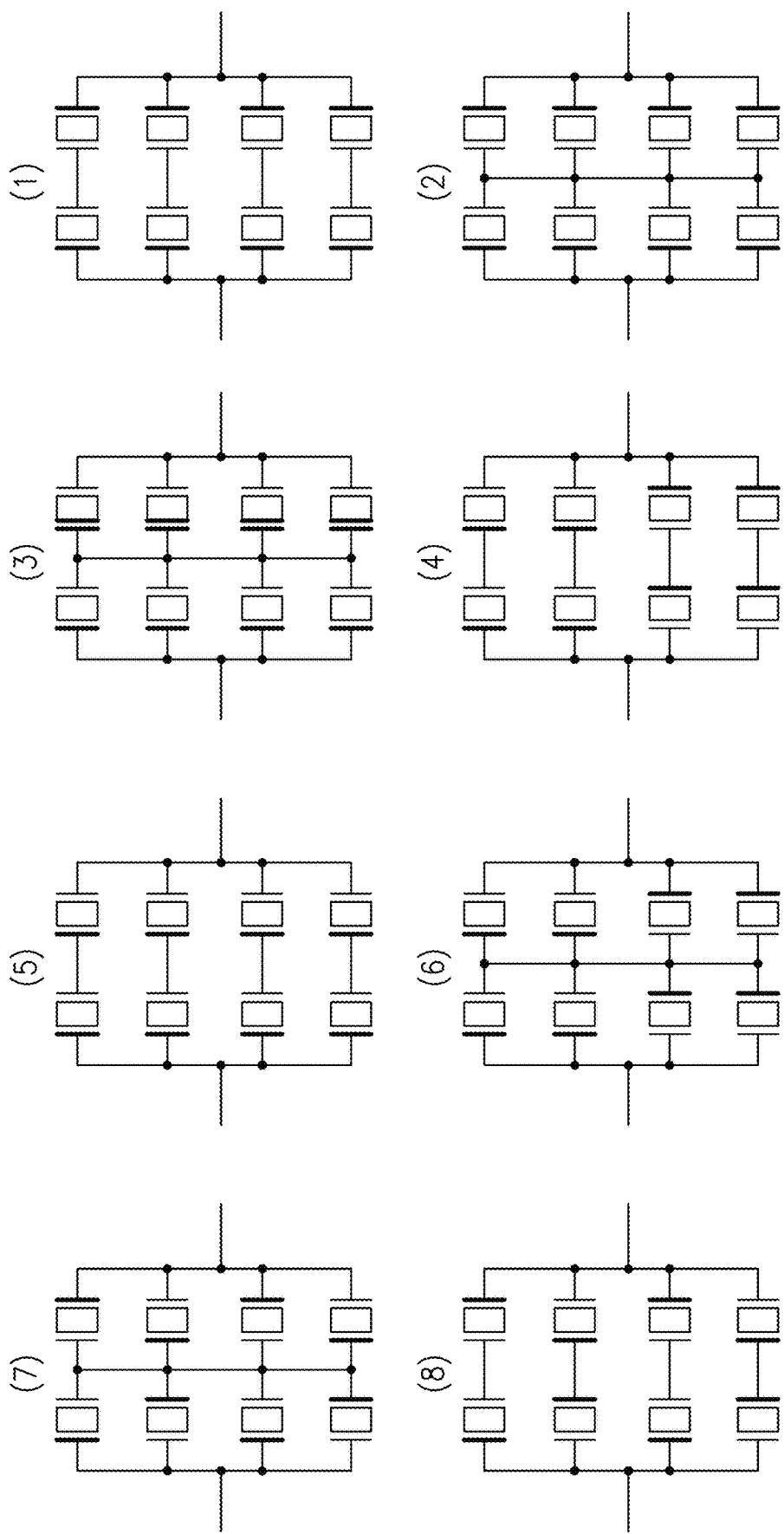

FIG. 13B-(1), (4), (5), and (8) describe a connection of resonators including four subsets connected in parallel, each of the subsets is a dual resonator connected in series. Each connection illustrated in FIG. 13B-(1), (4), (5), and (8) has different direction of arrangement for each of the resonators.

FIG. 13B-(2), (3), (6), and (7) describe a connection of resonators including two subsets connected in series, each of the subsets is a quad resonator connected in parallel. Each connection illustrated in FIG. 13B-(2), (3), (6), and (7) has different direction of arrangement for each of the resonators.

The octane resonator circuits illustrated in FIG. 13 have identical characteristics of power ruggedness, and might have different harmonics and IMD depending on its structure.

Figure 14A:
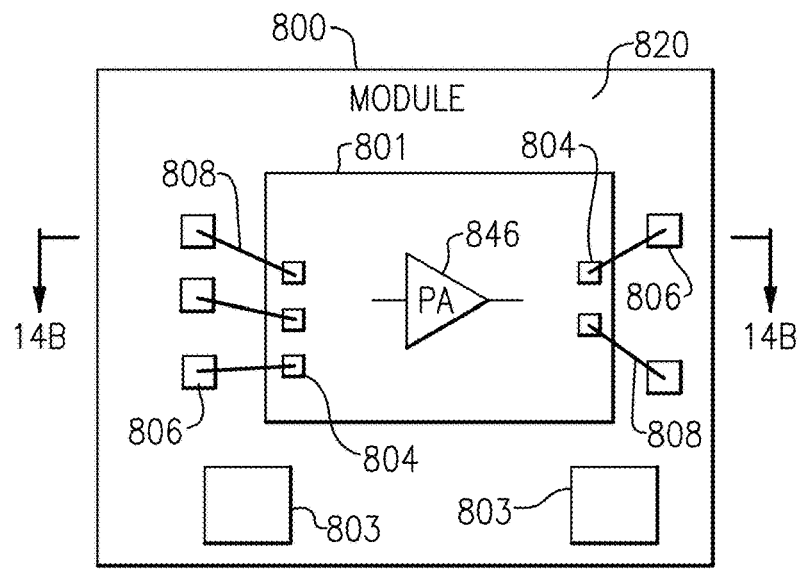
FIG. 14A is a schematic diagram of one embodiment of a packaged module.
Figure 14B:
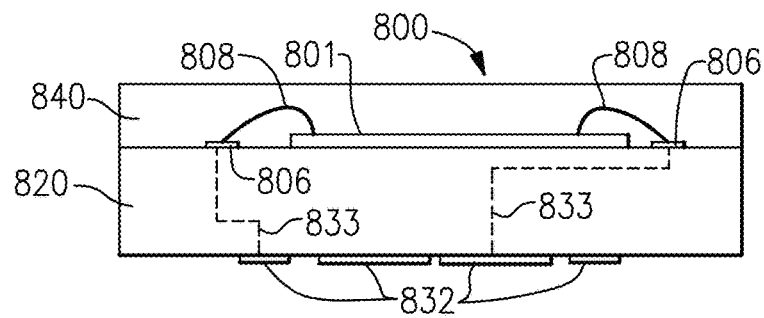
FIG. 14B is a schematic diagram of a cross-section of the packaged module of FIG. 14A taken along the lines 14B-14B.

FIG. 14A is a schematic diagram of one embodiment of a packaged module 800. FIG. 14B is a schematic diagram of a cross-section of the packaged module 800 of FIG. 14A taken along the lines 14A-16B.

The packaged module 800 includes an IC or die 801, surface mount components 803, wirebonds 808, a package substrate 820, and encapsulation structure 840. The package substrate 820 includes pads 806 formed from conductors disposed therein. Additionally, the die 801 includes pads 804, and the wirebonds 808 have been used to electrically connect the pads 804 of the die 801 to the pads 806 of the package substrate 801.

The die 801 includes a filter module, which can be implemented in accordance with any of the embodiments herein.

The packaging substrate 820 can be configured to receive a plurality of components such as the die 801 and the surface mount components 803, which can include, for example, surface mount capacitors and/or inductors.

As shown in FIG. 14B, the packaged module 800 is shown to include a plurality of contact pads 832 disposed on the side of the packaged module 800 opposite the side used to mount the die 801. Configuring the packaged module 800 in this manner can aid in connecting the packaged module 800 to a circuit board such as a phone board of a wireless device. The example contact pads 832 can be configured to provide RF signals, bias signals, power low voltage(s) and/or power high voltage(s) to the die 801 and/or the surface mount components 803. As shown in FIG. 14B, the electrically connections between the contact pads 832 and the die 801 can be facilitated by connections 833 through the package substrate 820. The connections 833 can represent electrical paths formed through the package substrate 820, such as connections associated with vias and conductors of a multilayer laminated package substrate.

In some embodiments, the packaged module 800 can also include one or more packaging structures to, for example, provide protection and/or facilitate handling of the packaged module 800. Such a packaging structure can include overmold or encapsulation structure 840 formed over the packaging substrate 820 and the components and die(s) disposed thereon.

It will be understood that although the packaged module 800 is described in the context of electrical connections based on wirebonds, one or more features of the present disclosure can also be implemented in other packaging configurations, including, for example, flip-chip configurations.

Figure 15:
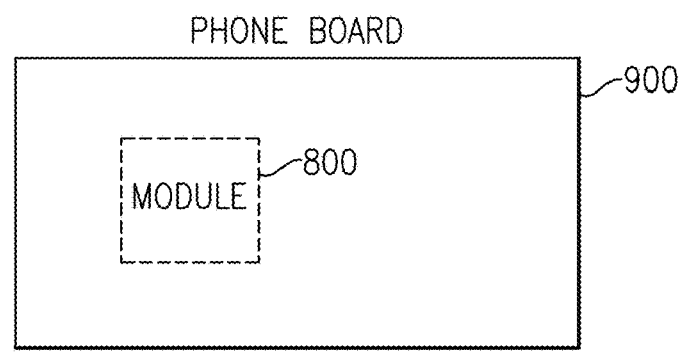
FIG. 15 is a schematic diagram of one embodiment of a phone board.

FIG. 15 is a schematic diagram of one embodiment of a phone board 900. The phone board 900 includes the module 800 shown in FIGS. 14A-14B attached thereto. Although not illustrated in FIG. 15 for clarity, the phone board 800 can include additional components and structures.

Applications

Some of the embodiments described above have provided examples in connection with wireless devices or mobile phones. However, the principles and advantages of the embodiments can be used for any other systems or apparatus that have needs for power amplifiers.

Such envelope trackers can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A filter module comprising:
a first terminal;
a second terminal;
at least one filter disposed along each signal path extending from the first terminal to the second terminal, the at least one filter including a plurality of resonators configured to enhance power ruggedness of the filter module, the plurality of resonators including a first octane resonator including eight resonators arranged in four subsets, each of the four subsets including a dual resonator including two resonators connected in series or each of the four subsets including a dual resonator including two resonators connected in parallel, a resonator frequency configured by the plurality of resonators shifted out of a target frequency band, the target frequency band being a communication band assigned to the at least one filter, such that when the at least one filter receives radio frequency signals at the target frequency band, power consumed by the at least one filter is reduced as a result of the shift of the resonator frequency; and
a matching circuit configured for impedance matching of the at least one filter and coupled to the at least one filter.

2. The filter module of claim 1 wherein each of the plurality of resonators is a bulk acoustic wave resonator or a film bulk acoustic resonator.

3. The filter module of claim 1 wherein the four subsets are connected in series.

4. The filter module of claim 1 wherein the resonator frequency is deviated from the target frequency band by 3 MHz to 20 MHz.

5. The filter module of claim 1 wherein the first terminal is an input contact configured to be connected to an antenna.

6. The filter module of claim 1 wherein the plurality of resonators includes a second octane resonator.

7. A filter module comprising:
a first terminal;
a second terminal;
at least one filter disposed along each signal path extending from the first terminal to the second terminal, the at least one filter including a plurality of resonators configured to enhance power ruggedness of the filter module, the plurality of resonators including a first octane resonator including eight resonators arranged in two subsets, each of the two subsets including a quad resonator including four resonators connected in series or each of the two subsets including a quad resonator including four resonators connected in parallel, a resonator frequency configured by the plurality of resonators shifted out of a target frequency band, the target frequency band being a communication band corresponding to the at least one filter, such that when the at least one filter receives radio frequency signals at the target frequency band, power consumed by the at least one filter is reduced as a result of the shift of the resonator frequency; and a matching circuit configured for impedance matching of the at least one filter and coupled to the at least one filter.

8. The filter module of claim 7 wherein each of the eight resonators of the first octane resonator is one of a bulk acoustic wave resonator and a film bulk acoustic resonator.

9. The filter module of claim 7 wherein the two subsets are connected in series.

10. The filter module of claim 7 wherein the two subsets are connected in parallel.

11. The filter module of claim 7 wherein the first terminal is an input contact configured to be connected to an antenna.

12. The filter module of claim 7 wherein the plurality of resonators further includes a second octane resonator.

13. A mobile device comprising:
an antenna configured to receive a radio frequency signal; and
a front end system configured to communicate with the antenna, the front end system including a filter module including a first terminal; a second terminal; at least one filter disposed along each signal path extending from the first terminal to the second terminal, the at least one filter including a plurality of resonators configured to enhance power ruggedness of the filter module, the plurality of resonators including an octane resonator including eight resonators arranged in four subsets, each of the four subsets including a dual resonator including two resonators connected in series or each of the four subsets including a dual resonator including two resonators connected in parallel, a resonator frequency configured by the plurality of resonators shifted out of a target frequency band, the target frequency band being a communication band assigned to the at least one filter, such that when the at least one filter receives radio frequency signals at the target frequency band, power consumed by the at least one filter is reduced as a result of the shift of the resonator frequency; and a matching circuit configured for impedance matching of the at least one filter and coupled to the at least one filter.

14. The mobile device of claim 13 wherein each of the plurality of resonators is a bulk acoustic wave resonator or a film bulk acoustic resonator.

15. The mobile device of claim 13 wherein the four subsets are connected in series.

16. The mobile device of claim 13 wherein the resonator frequency is deviated from the target frequency band by 3 MHz to 20 MHz.

17. The mobile device of claim 13 wherein the four subsets are connected in parallel.

18. A mobile device comprising:
an antenna configured to receive a radio frequency signal; and
a front end system configured to communicate with the antenna, the front end system including a filter module including a first terminal, a second terminal, and at least one filter disposed along each signal path extending from the first terminal to the second terminal, the at least one filter including a plurality of resonators configured to enhance power ruggedness of the filter module, the plurality of resonators including an octane resonator including eight resonators arranged in two subsets, each of the two subsets including a quad resonator including four resonators connected in series or each of the two subsets including a quad resonator including four resonators connected in parallel, a resonator frequency configured by the plurality of resonators shifted out of a target frequency band, the target frequency band being a communication band corresponding to the at least one filter, such that when the at least one filter receives radio frequency signals at the target frequency band, power consumed by the at least one filter is reduced as a result of the shift of the resonator frequency; and a matching circuit configured for impedance matching of the at least one filter and coupled to the at least one filter.

19. The mobile device of claim 18 wherein each of the eight resonators is one of a bulk acoustic wave resonator, and a film bulk acoustic resonator.

20. The mobile device of claim 18 wherein the two subsets are connected in series.

21. The mobile device of claim 20 wherein the two subsets are connected in parallel.

22. The filter module of claim 1 wherein the four subsets are connected in parallel.

\* \* \* \* \*